United States Patent
Nikonov et al.

(10) Patent No.: US 12,001,941 B2
(45) Date of Patent: Jun. 4, 2024

(54) WIRELESS OSCILLATOR NEURAL NETWORK

(71) Applicant: Intel Corporation, Santa Clara, CA (US)

(72) Inventors: Dmitri E. Nikonov, Beaverton, OR (US); Sasikanth Manipatruni, Portland, OR (US); Ian A. Young, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 918 days.

(21) Appl. No.: 16/194,792

(22) Filed: Nov. 19, 2018

(65) Prior Publication Data
US 2020/0160145 A1    May 21, 2020

(51) Int. Cl.
   *G06N 3/049*    (2023.01)
   *G06N 3/045*    (2023.01)
   *G06N 3/08*     (2023.01)

(52) U.S. Cl.
   CPC ............ *G06N 3/049* (2013.01); *G06N 3/045* (2023.01); *G06N 3/08* (2013.01)

(58) Field of Classification Search
   CPC ........ G06N 3/084; G06N 3/02; G06N 3/0454; G06N 3/04; G06N 3/049; G06N 3/0635; G06N 20/00; G06N 3/08; G06N 7/00; G06N 3/063; G06N 3/00; H03L 7/08; H03L 7/085; H03B 5/36; G06G 7/12; G06K 9/00973; G06K 9/62; G06T 2207/20084
   See application file for complete search history.

(56) References Cited

U.S. PATENT DOCUMENTS

| | | | | |
|---|---|---|---|---|
| 8,700,343 B2* | 4/2014 | Kitami | ................. | G01F 1/8431 702/45 |
| 9,299,102 B1* | 3/2016 | Pike | .................... | H04W 4/023 |
| 2009/0227876 A1* | 9/2009 | Tran | ...................... | A61B 5/002 600/483 |
| 2013/0073491 A1* | 3/2013 | Izhikevich | ............. | G06N 3/049 706/15 |
| 2015/0142715 A1* | 5/2015 | Esterline | ................. | G06N 7/00 706/23 |
| 2017/0214517 A1* | 7/2017 | Kondo | ................. | G06F 1/3278 |

OTHER PUBLICATIONS

Zhang et al., A Coupled Schmitt Trigger Oscillator Neural Network for Pattern Recognition Applications (Aug. 5-8, 2018) (Year: 2018).*
Velichko et al. "A New Method of the Pattern Storage and Recognition in Oscillatory Neural Networks Based on Resistive Switches" (Sep. 10, 2018) (Year: 2018).*
Hoppensteadt et al., Oscillatory Neurocomputers with Dynamic Connectivity (Apr. 5, 1999) (Year: 1999).*

* cited by examiner

*Primary Examiner* — Luis A Sitiriche
(74) *Attorney, Agent, or Firm* — Akona IP PC (57) ABSTRACT

Embodiments may relate to a system to be used in an oscillating neural network (ONN). The system may include a control node and a plurality of nodes wirelessly communicatively coupled with a control node. A node of the plurality of nodes may be configured to identify an oscillation frequency of the node based on a weight W and an input X. The node may further be configured to transmit a wireless signal to the control node, wherein a frequency of the wireless signal oscillates based on the identified oscillation frequency. Other embodiments may be described or claimed.

17 Claims, 6 Drawing Sheets

WIRELESS OSCILLATOR NEURAL NETWORK

BACKGROUND

The invention is related to the field of machine learning and artificial intelligence, and more specifically to neural networks. Extensive sensor networks may be used for various internet of things (IoT) applications, video processing, surveillance, robotics, autonomous driving, etc. However, many sensor networks may suffer from one or more bottlenecks based on the hierarchical nature of such networks.

DETAILED DESCRIPTION

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact.

In various embodiments, the phrase "a first feature formed, deposited, or otherwise disposed on a second feature," may mean that the first feature is formed, deposited, or disposed over the feature layer, and at least a part of the first feature may be in direct contact (e.g., direct physical or electrical contact) or indirect contact (e.g., having one or more other features between the first feature and the second feature) with at least a part of the second feature.

Various operations may be described as multiple discrete operations in turn, in a manner that is most helpful in understanding the claimed subject matter. However, the order of description should not be construed as to imply that these operations are necessarily order dependent.

Embodiments herein may be described with respect to various Figures. Unless explicitly stated, the dimensions of the Figures are intended to be simplified illustrative examples, rather than depictions of relative dimensions. For example, various lengths/widths/heights of elements in the Figures may not be drawn to scale unless indicated otherwise. Additionally, some schematic illustrations of example structures of various devices and assemblies described herein may be shown with precise right angles and straight lines, but it is to be understood that such schematic illustrations may not reflect real-life process limitations which may cause the features to not look so "ideal" when any of the structures described herein are examined, e.g., using scanning electron microscopy (SEM) images or transmission electron microscope (TEM) images. In such images of real structures, possible processing defects could also be visible, e.g., not-perfectly straight edges of materials, tapered vias or other openings, inadvertent rounding of corners or variations in thicknesses of different material layers, occasional screw, edge, or combination dislocations within the crystalline region, and/or occasional dislocation defects of single atoms or clusters of atoms. There may be other defects not listed here but that are common within the field of device fabrication.

As noted above, extensive sensor networks may be used for various applications. However, in many legacy networks the sensors may be wired to a common node and designed to feed raw digital data to the common node. This type of architecture may be referred to as a hierarchical architecture. However, the throughput and energy efficiency of such a network may be limited by bottlenecks at the common node.

More specifically, Neural networks may process information in an analog non-Boolean manner with some similarity to biological brains. A subset of neural networks—e.g., ONNs—may include nodes with oscillators, and process the information by varying the frequencies of the various oscillators. Legacy neural networks may be embodied by a circuit block on a single integrated circuit substrate. However, in embodiments herein, the neural network functionality may be performed by a network that includes multiple integrated circuits connected by wireless links. The wireless network may be a part of a high-performance computing system. In this case, the results of computation on each circuit may provide inputs into the ONN. Alternatively, the wireless network can be based on a sensor network. In that case, the signal from a sensor may provide an input to the ONN.

By contrast, in embodiments herein, sensor nodes may be connected to one another and to a control node by wireless links at variable frequencies. The signals transmitted by the sensor nodes may be tuned in response to input(s) of a sensor of the sensor node. These input(s)n may be referred to herein as "sensor data." The sensor nodes and the control node may, together, form an oscillating neural network, or a portion thereof. The sensor data may then be processed as data of an ONN as will be described in greater detail below.

Embodiments herein may provide a number of advantages. For example, the sensor data may not need to be transferred to a common node for processing. Rather the sensor data may be processed in-place by the sensors themselves. By processing the data in-place, the latency or energy use of the ONN may be reduced. Finally, processing the data in-place may allow the ONN to identify patterns or trends in the sensor data.

Generally, it will be understood that the description of embodiments with respect to a network is intended as one example embodiment. However, other embodiments may include an ONN that includes wirelessly-connected nodes used for some other application. For example, the ONN may include a high-performance computing (HPC) pool of processors that are cooperatively working on a single computation, i.e. each processor working on its own chunk of data. Such a configuration may be referred to as "distributed computing." Once a node performs a stage of calculation, the nodes may exchange data. The ONN may check the results for a pattern which it may recognize. The nodes of the ONN may receive the result of the check in a form of a spectrum of received frequencies. Other embodiments may relate to some other configuration of nodes in an ONN.

Figure 1:
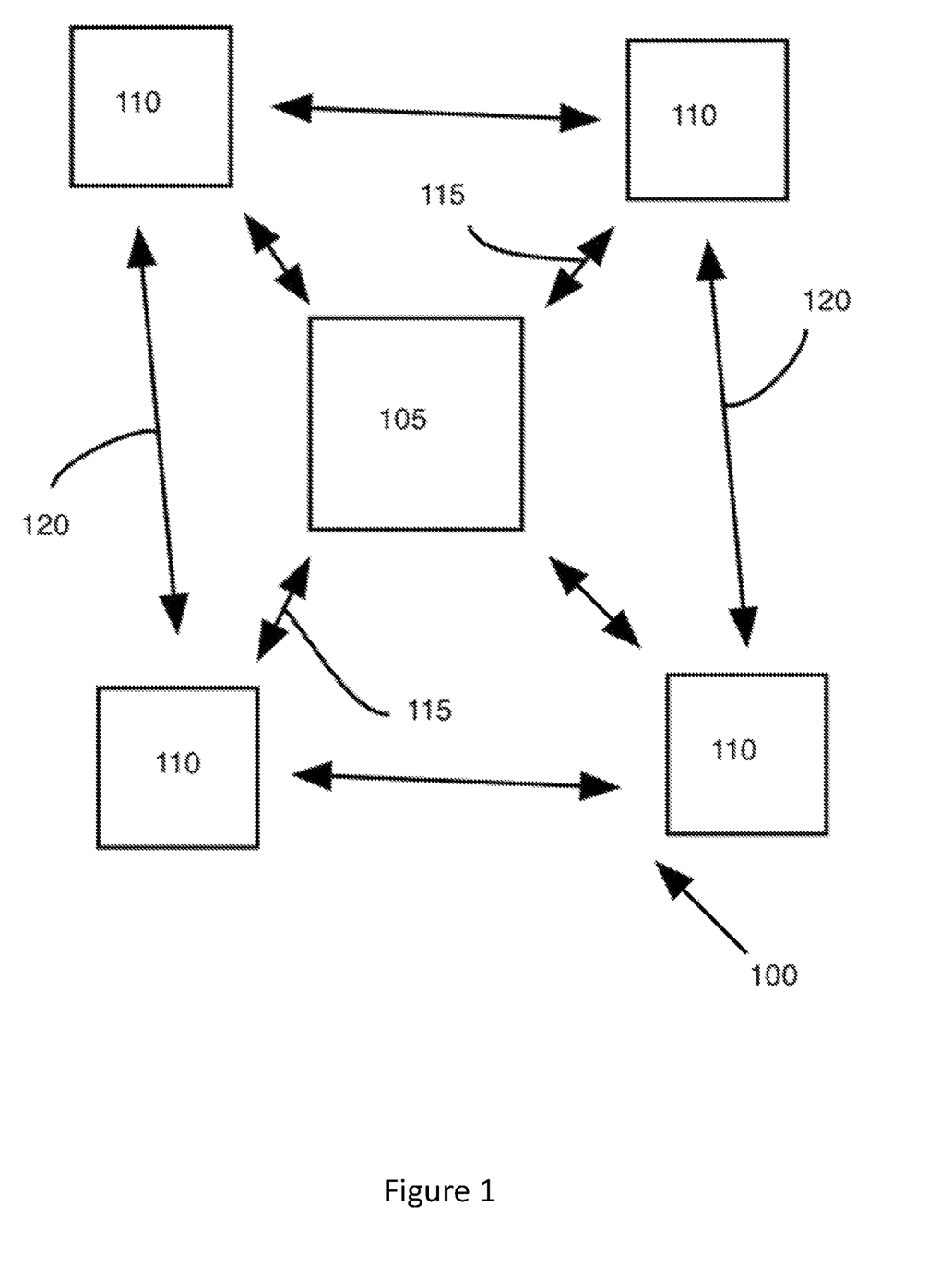
FIG. 1 depicts an example structure of an oscillating neural network (ONN) based on a network of wireless nodes, in accordance with embodiments herein.

FIG. 1 depicts an example ONN 100 based on a network of wireless nodes, in accordance with embodiments herein. The ONN 100 may include a control node 105, which may be configured to operate as a centralized processor or averager of the ONN 100 as will be described in further detail below. The ONN 100 may further include a plurality of nodes 110. The nodes 110 may be configured to detect sensed data and perform some amount of processing on the data in accordance with ONN functionality.

The nodes 110 may be communicatively coupled with the control node 105 by a wireless link such as wireless link 115. Additionally, the nodes 110 may be coupled with one another by wireless links 120. Generally, the wireless links 115/120 may be wireless links in accordance with a cellular protocol such as Global System for Mobile Communication (GSM), General Packet Radio Service (GPRS), Universal Mobile Telecommunications System (UMTS), High Speed Packet Access (HSPA), Evolved HSPA (E-HSPA), Long-Term Evolution (LTE) network, Enhanced Data for GSM Evolution (EDGE), GSM EDGE Radio Access Network (GERAN), Universal Terrestrial Radio Access Network (UTRAN), Evolved UTRAN (E-UTRAN), Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. In other embodiments the wireless links 115/120 may be in accordance with a short-range protocol such as Bluetooth, WiFi, or some other protocol. In other embodiments the wireless links 115/120 may be in accordance with some other wireless protocol either already developed or developed at a later date.

It will be understood that the example of FIG. 1 is intended as a highly simplified example, and in some portions may be considered to only depict a portion of an ONN. For example, although FIG. 1 may depict only a single control node 105 and four nodes 110, in other embodiments a functional ONN may include a plurality of control nodes 105 and on the order of tens to hundreds or even thousands of nodes 110. Additionally, a functional ONN may include a number of additional components, such as additional servers or processors coupled with the control node 105.

Figure 2:
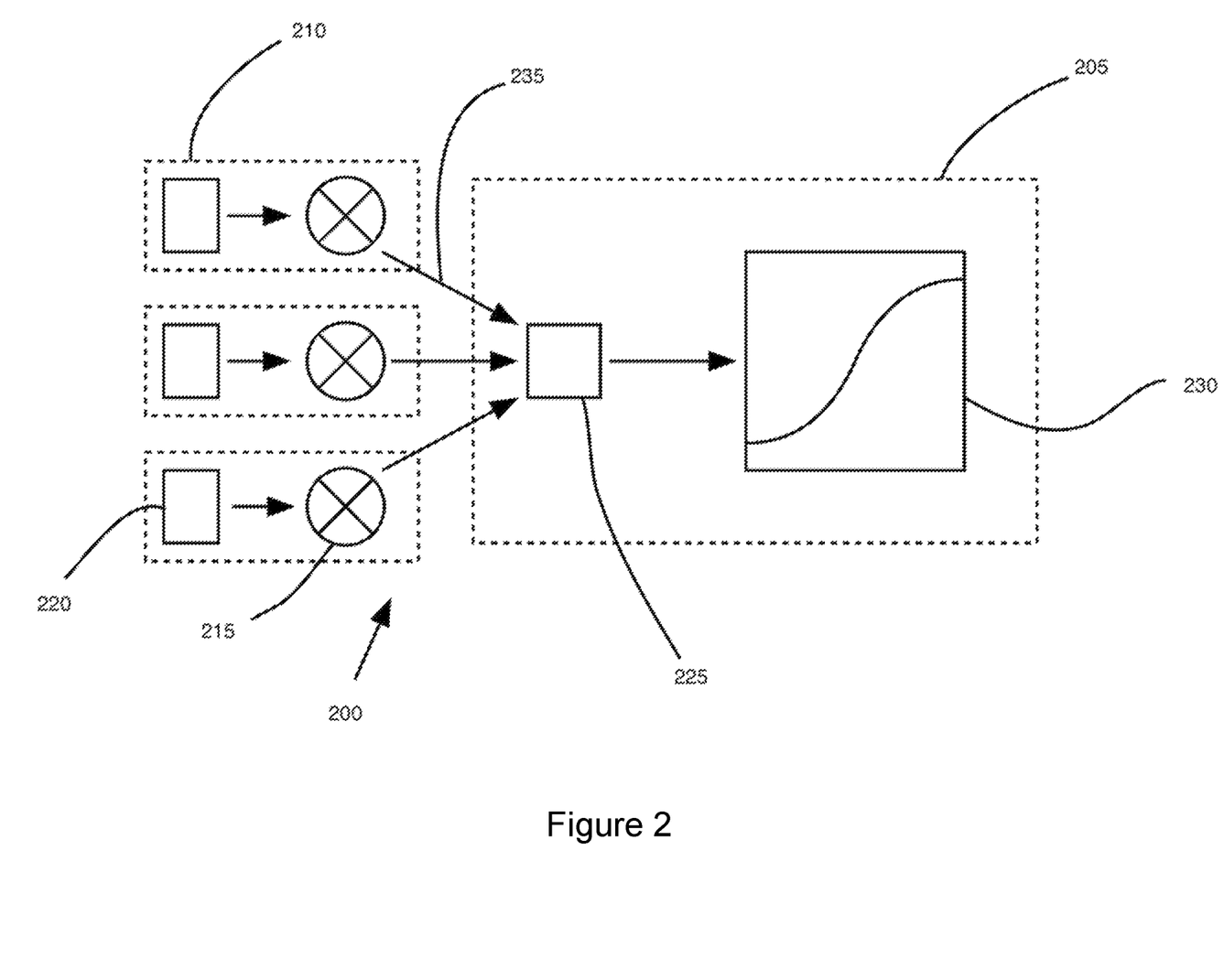
FIG. 2 depicts an example diagram of information processing in an ONN, in accordance with embodiments herein.

FIG. 2 depicts an example diagram of information processing in an ONN, in accordance with embodiments herein. Generally, similarly to FIG. 1 above, FIG. 2 may depict a highly simplified ONN 200, which may in some embodiments be considered to be a portion of an ONN. That is, a plurality of the structures depicted in FIG. 2 may be present in a functional ONN. However, the simplified version of FIG. 2 may be considered an example of embodiments herein.

The ONN 200 may include a control node 205 (which may be referred to as a "neuron") and a plurality of nodes 210 (which may be referred to as "synapses"), which may be respectively similar to control node 105 and nodes 110. Generally, in FIG. 2, examples of functions that may be performed by the control node 205 or the nodes 210 are depicted. Specifically, in the node 210, an input 220 may be provided to a processor 215. The input 220 may be, for example, a data provided by a sensor of the node 210. The data may be related to, for example, acceleration, temperature, humidity, location (e.g., based on a global positioning signal (GPS) system), or some other type of data. The processor may then process the data of the input 220. More specifically, the processor 215 may apply a weight, stored in a memory of processor 215, to the input 220. The application of a weight may be a multiplication or determining of difference of the input and the weight quantities. The result of weight application is used to vary the frequency of an oscillator, which can be for example a voltage-controlled oscillator. The outputs 235 of the oscillators may be combined in an "averager" 225. In various embodiments the set of inputs 220 may be mathematically represented by the vector variable X and the set of weights may be represented by the vector variable W. The combination of outputs 235 of the set of nodes 210 may be represented by the equation X*W. The combination of outputs 235 of the set of nodes 210 may be represented by the equation $(X-W)^2$. The function of the ONN 200 is to produce an output signal which is the measure of distance between the vector of inputs X and a memorized pattern W. The closeness of these vectors indicates recognition of a memorized pattern in the input data. It will be understood that this equation is highly simplified for the sake of description and in other embodiments may include one additional constants, variables, or other elements of a mathematical function. However, this equation will be discussed herein as a basic equation for description of the general concept of the ONN.

Each signal may be received by the control node 205 and input to an averager 225. The averager 225 may sum the inputs of each of the signals received from the various nodes 205. For example, if each node provides a signal that is oscillating based on the equation X*W, then the averager 225 may, for n nodes, process the inputs based on the equation $X_1*W_1+X_2*W_2+X_3*W_3+\ldots+X_n*W_n$. As noted above, this equation may be considered to be a highly simplified example equation that may not be appropriate for real-world implementations, but may useful for a general description of the functionality of an ONN.

A non-linear thresholding function 230 may then be applied to the resultant output of the averager 225. The non-linear thresholding function 230 may be, for example a sigmoid function, $1/(1+\exp(-x))$, a hyperbolic tangent, tanh (x), or a rectified linear unit (ReLU). Together, the one or more elements of the control node 205 (e.g., the "neuron")

perform the functions related to the averager 225 and the non-linear thresholding function 230 also may be referred to as an "activation function."

Some ONNs (which may, for example, be referred to as deep neural networks (DNNs)) may include multiple neural blocks (e.g., multiple nodes such as nodes 210). These blocks may be combined in parallel as well as cascade sequentially. The result of the overall DNN operation may be, for example, recognition of images and patterns.

Figure 3:
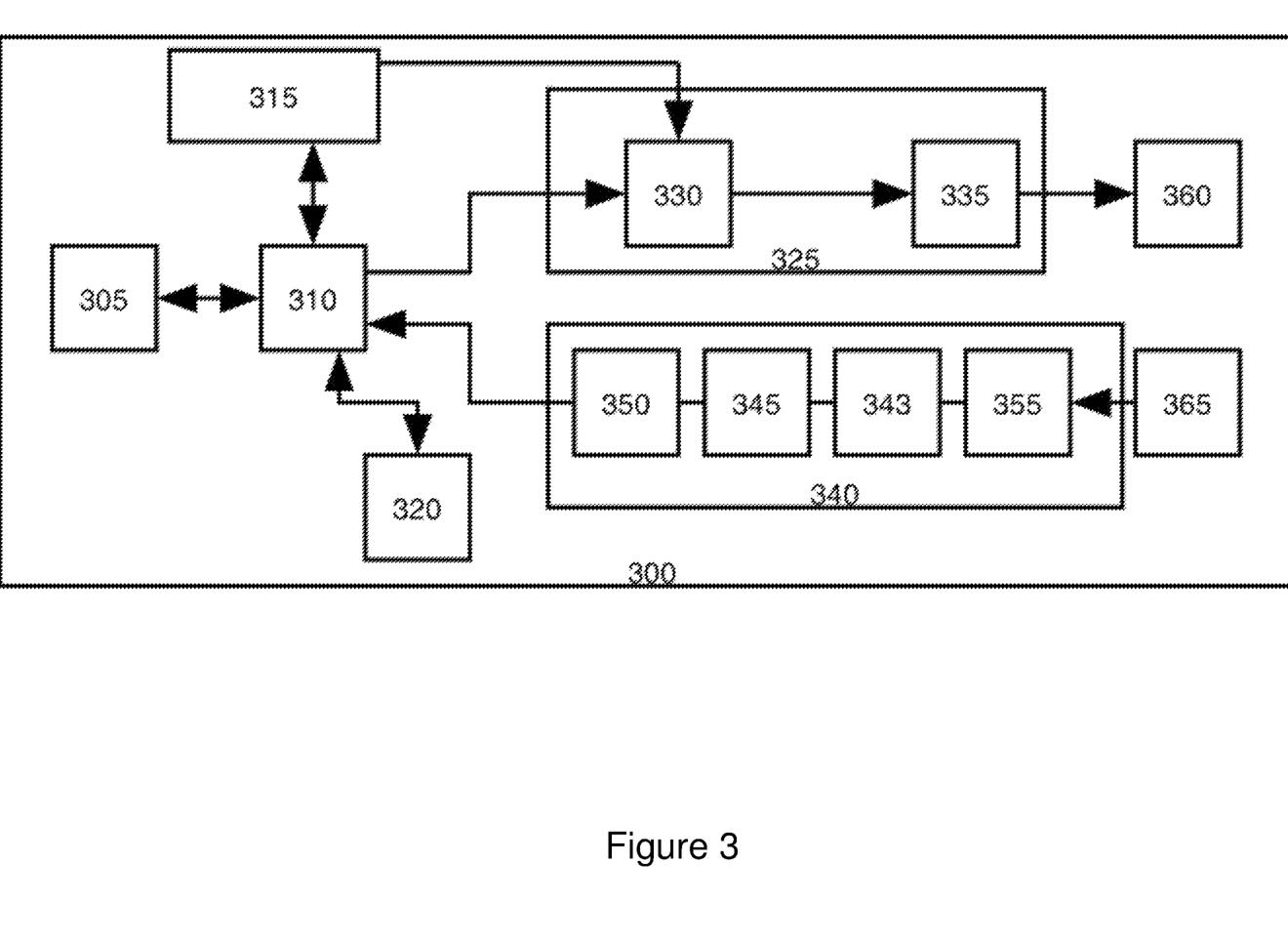
FIG. 3 depicts a simplified example structure of a wireless node, in accordance with embodiments herein.

FIG. 3 depicts a simplified example structure of a node 300, in accordance with embodiments herein. The node 300 may be similar to, for example, nodes 110 or 210. The nodes of the wireless ONN may, in some embodiments, be nodes of a sensor network. The sensor node 300 may include a sensor 305 which may be, for example, a pressure sensor, a sensor related to temperature, an accelerometer, a gyroscope, a noise or vibration sensor, or some other type of sensor. The sensor 305 may be communicatively coupled with a processor 310 which may be, for example, similar to processor 215. Specifically, the processor 310 may be a central processing unit (CPU), a general processing unit (GPU), a single-core processor, a multi-core processor, or some other type of processor. Generally, the processor 310 may be configured to apply the weight W to the input X. In some embodiments, the application of the weight W to the input X may be based on hardware, software, firmware, or some combination thereof that is either an element of the processor 310 or that is communicatively coupled with the processor 310. For example, the processor 310 may be communicatively coupled with a memory 320 which is configured to store one or more instructions which may be implemented by the processor to perform one or more of the functions described above. In various embodiments the memory 320 may be, for example, dynamic random access memory (DRAM), non-volatile memory (NVM), static random access memory (SRAM), a solid-state, optical, or magnetic memory, or some other type of memory.

The processor 310 may also be communicatively coupled with a power supply 315. The power supply 315 may be an alternating current (AC) or direct current (DC) power supply. For example, in some embodiments the power supply 315 may be some form of power generator, a battery, or some other type of power supply. Generally, the power supply 315 may be configured to provide power to the processor 310 as depicted in FIG. 3. Additionally or alternatively the power supply 315 may be configured to provide power to some other element of the sensor node 300. The sensor node 300 may further include a transmit module 325. The transmit module 325 may include, for example, a voltage-controlled oscillator (VCO) 330. The transmit module 325 may further include a power amplifier 335. In some embodiments the VCO may be communicatively coupled with the power supply 315 as depicted in FIG. 3.

As noted above, the processor 310 may be configured to identify an oscillating frequency based on the input X and the weight W. The sensor node 300 may then be able to transmit an oscillating wireless signal based on the oscillating frequency. In order to do so, the processor 310 may alter the voltage input to the VCO 330. More specifically, the processor 310 may be configured to alter the voltage provided by the power supply 315 to the VCO 330. By altering the voltage input to the VCO, the oscillating frequency output by the VCO 330 to the power amplifier 335 may be altered. The power amplifier 335 may amplify the signal received from the VCO 330 and provide that amplified signal to a transmit antenna 360 of the sensor node 300, where the resultant frequency-oscillating wireless signal (i.e., a wireless signal with a frequency that oscillates based on the oscillating frequency output by the VCO 330) is then transmitted from the sensor node 300 along a wireless link such as links 115 or 120. In this manner, the processor 310 may be able to tune the oscillating frequency of the signal output by the transmit antenna 360 to the desired oscillating frequency identified by the input X and the weight W as described above.

The sensor node 300 may further include a receive module 340. The receive module 340 may be coupled with a receive antenna 365 which may be similar to the transmit antenna 360. More specifically, the transmit or receive antennas 360 or 365 may be a ribbon-type antenna or some other type of antenna. Additionally, in some embodiments even though the transmit and receive antennas 360 and 365 are depicted as separate elements in FIG. 3, in other embodiments the transmit and receive antennas 360 and 365 may be the same element, or may be physically coupled with one another.

The signal from the receive antenna 365 may be provided to a low noise amplifier (LNA) 355 were the signal may be amplified. More specifically, in some embodiments the LNA 355 may only amplify a portion of the signal to boost the "signal" portion of the signal while reducing or eliminating "noise" of the signal. The output from the LNA 355 may then be provided to an analog buffer 343 where data may be stored. For example, in some embodiments a full communication from one wireless device (e.g. a control node, a sensor node, or some other type of device) to the sensor node 300 may require a plurality of signals. In other embodiments, the signal from the LNA 355 may be received by the analog buffer 343 as a sequential stream of data. In these embodiments, it may be desirable to store the signals in the analog buffer 343 for further processing.

The data from the analog buffer 343 may then be input to a frequency divider 345 where it may be further processed. For example, one or more filters such as a low-pass filter, a high-pass filter, an envelope filter, or some other type of filter may be applied to further separate the "signal" portion from the "noise" of the signal. The output of the frequency divider 345 may then be output to an output buffer 350 where it may be stored until it is communicated to the processor 310. The receiver module 340 may receive the combination of signals from multiple wireless nodes at various frequencies which are within the width of its receiving band. The sum of signals with close frequencies may provide an input with the largest amplitude. A phase and frequency detector (not shown for the sake of eliminating clutter of the Figure) may determine the frequency difference between the prevalent received frequency and the transmitted frequency. The processor 310 may then change the transmitted frequency of the node 300 to be closer to the received frequency. As a result of this process, all transmitted frequencies of nodes which are within a certain locking range may synchronize to the same frequency as depicted and discussed in greater detail below in, for example, FIG. 5.

It will be understood that the above-described description of the sensor node 300 is intended as one example, and other embodiments may include variations from the configuration depicted in FIG. 3. For example, in some embodiments there may be more or fewer elements than depicted in FIG. 3. For example, there may be a plurality of sensors, processors, memories, power supplies, etc. In some embodiments, elements such as the output buffer 350 or the analog buffer 343 may not be present. In some embodiments, the various elements of the transmit module 325 or the receive module 340 may be implemented as hardware, software, firmware, or some combination thereof.

Figure 4:
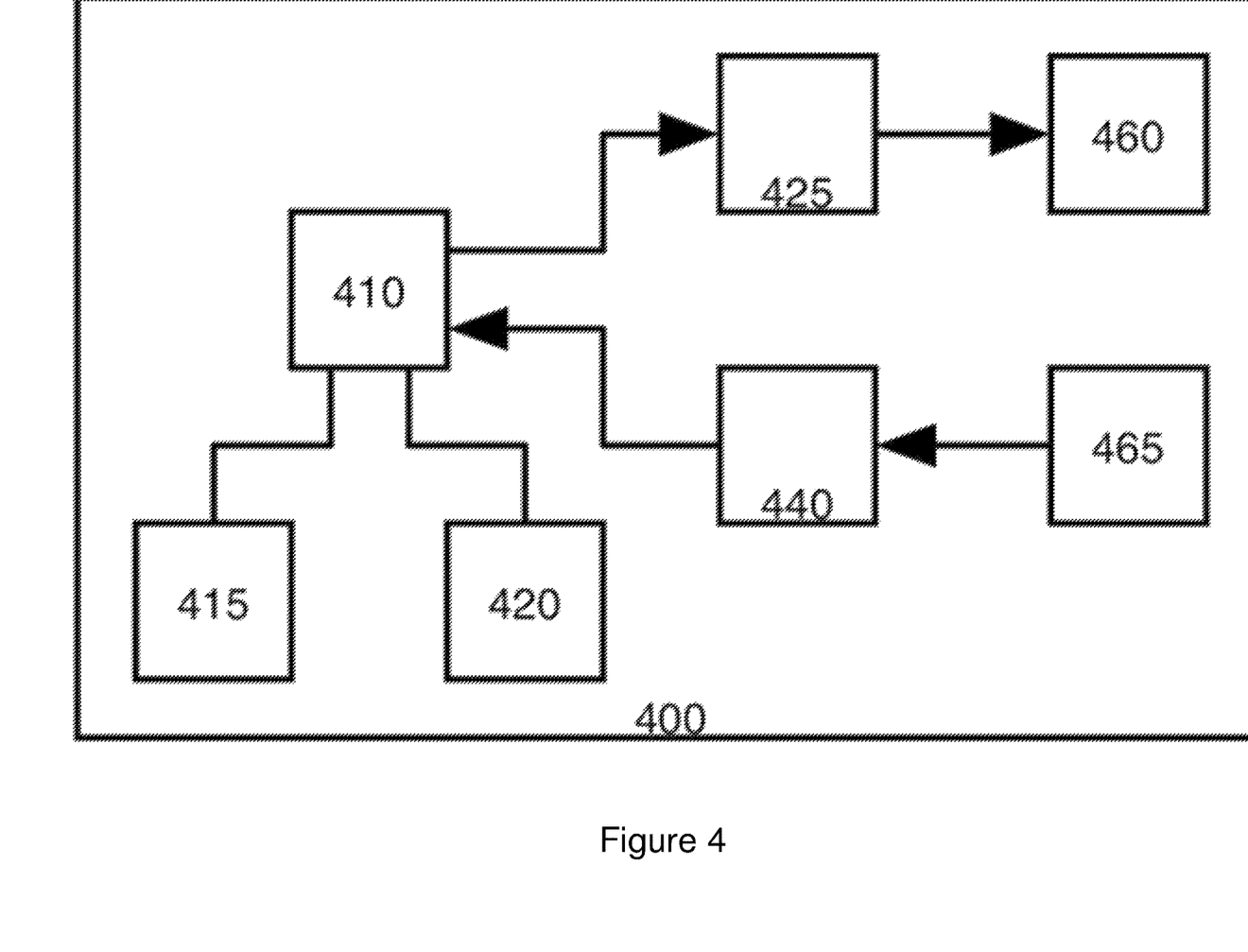
FIG. 4 depicts a simplified example structure of a control node, in accordance with embodiments herein.

FIG. 4 depicts a simplified example structure of a control node 400, in accordance with embodiments herein. Generally, a control node 400 may be a node that receives a plurality of signals in a wide band, sums the plurality of signals, applies a thresholding function to the result of the summing, and then re-transmits the result with one or more transmitters. More generally, the control node 400 may not be configured to receive a single sensor input from a sensor of the control node 400, and the control node 400 may not store a weight as described above. The control node 400 may be similar to, for example, control nodes 105 or 205. The control node 400 may include a variety of elements such as a processor 410, a power supply 415, and a memory 420, which may be respectively similar to processor 310, power supply 315, and memory 320. The control node 400 may additionally include a transmit module 425, a transmit antenna 460, a receive module 440, and a receive antenna 465 which may be respectively similar to transmit module 325, transmit antenna 360, receive module 340, and receive antenna 365. Generally the transmit module 425 and the receive module 440 may include various of the element discussed above with respect to transmit module 325 and receive module 340, however those elements are not reiterated herein with respect to FIG. 4 for the sake of avoidance of repetition.

Generally, the processor 410 may be configured to perform one or more of the function described above with respect to the control node 205 of FIG. 2. For example, the processor 410 may perform one or more of the averaging functions described above such as the averager at 225 or the non-linear threshold function at 230. In some embodiments, the processor 410 may therefore be referred to as an "averager." The averaging function(s) performed by the processor 410 may be implemented as hardware, software, firmware, or some combination thereof. For example, the processor 410 may include dedicated circuits or modules for performing one or more of the averaging functions. In other embodiments the memory 420 may include instructions that, when executed by the processor 410, may cause the processor 410 to perform one or more of the averaging functions described above. Other embodiments may include some combination thereof.

Similarly to the node 300 of FIG. 3, it will be understood that the embodiment of the control node 400 in FIG. 4 is intended as an example, and other embodiments may vary from that depicted in FIG. 4. For example, in some embodiments the control node 400 may have a plurality of processors such as processor 410, and each processor may be configured to implement a different one of the averaging functions, or a portion thereof. For example, a first processor may implement the averager 225 while another processor may implement the non-linear threshold function 230. Other variations may be present as well. In some embodiments the control node 400 may have a structure identical to that of the node 300. For example, in some embodiments the control node 400 may be a node such as node 300 that is coupled with other nodes by virtue of having its transmitted frequency within the receiver passband of other nodes.

Figure 5:
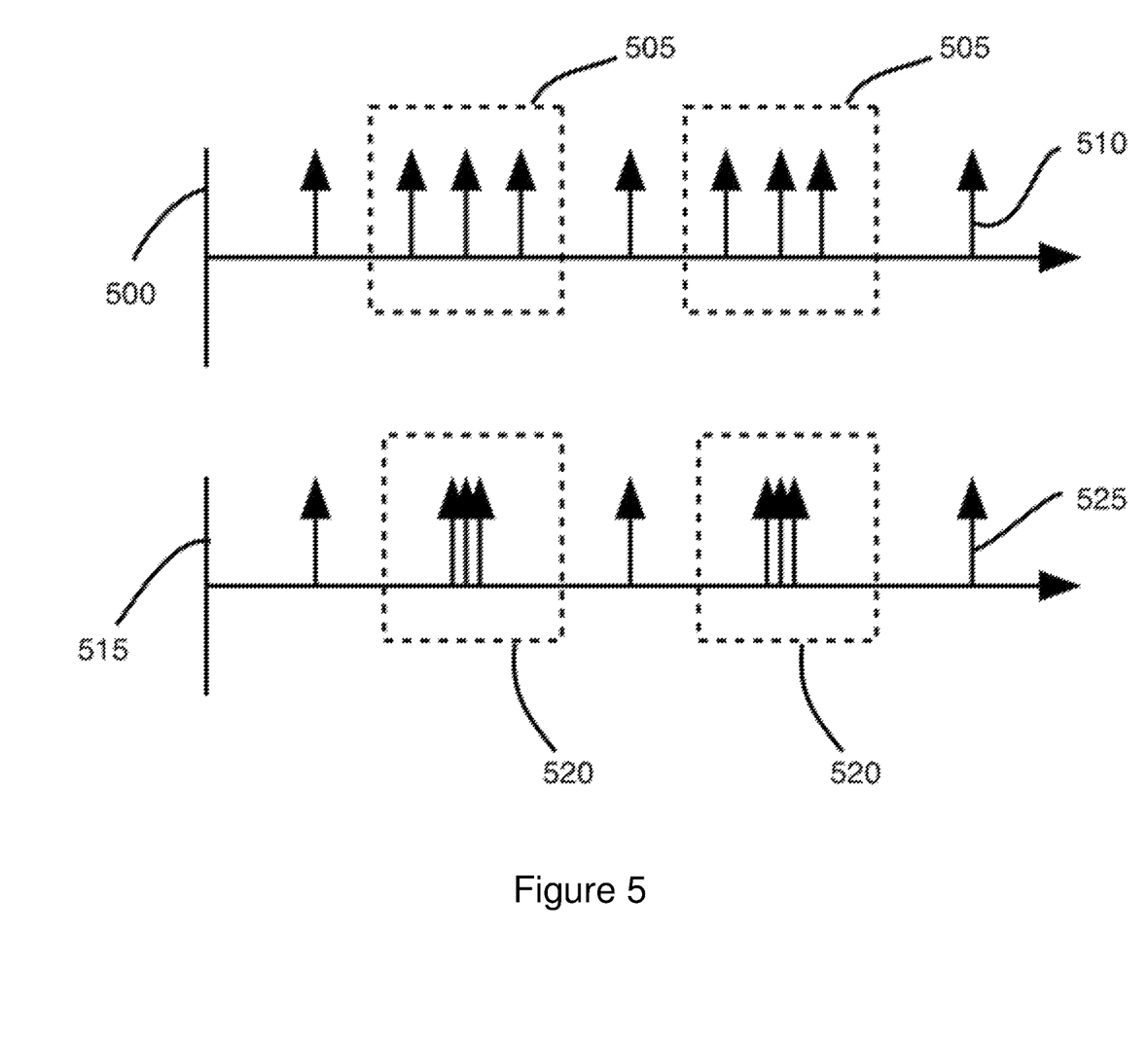
FIG. 5 depicts a simplified example of the spectrum of wireless signal frequencies in the process of frequency locking, in accordance with embodiments herein.

FIG. 5 depicts a simplified example of wireless signals frequency locking, in accordance with embodiments herein. More specifically, frequency locking in an ONN where a plurality of nodes may be transmitting wireless signals with different oscillating frequencies. A node 110 also receives wireless signals 120 from other nodes 110 with frequencies within a certain receiver band close to the transmitted frequencies.

Graph 500 depicts a frequency distribution, or, a spectrum, for a plurality of oscillating wireless signals 510, for example as may be transmitted from a plurality of nodes 110. Each of the "arrows" in the Figure represents a different transmission at a different frequency. More specifically, locations along the graph 500 indicate different frequencies within a given bandwidth. In embodiments, if two transmissions are within a certain locking range such as ranges 505, then over time the frequencies of the transmissions may naturally tend to synchronize with one another as discussed above. This phenomenon may be referred to as "locking" or "synchronization" of frequencies in an ONN. Graph 515 depicts the same transmissions as graph 500 at a point later in time after the synchronization has occurred. As can be seen, the frequency-oscillating wireless signals 525 within the locking ranges 520 have become significantly closer to one another along the frequency axis of graph 515. This locking phenomenon ensures that the output of the ONN, i.e. the signal received by the control node 400 approximates the threshold function applied to the sum of the signals from nodes 300. The output of an ONN may be used to recognize trends in the data obtained in nodes 300. It will be understood that although FIG. 5 depicts two locking ranges, in real-world embodiments there may be more or fewer locking ranges at different frequency windows.

Figure 6:
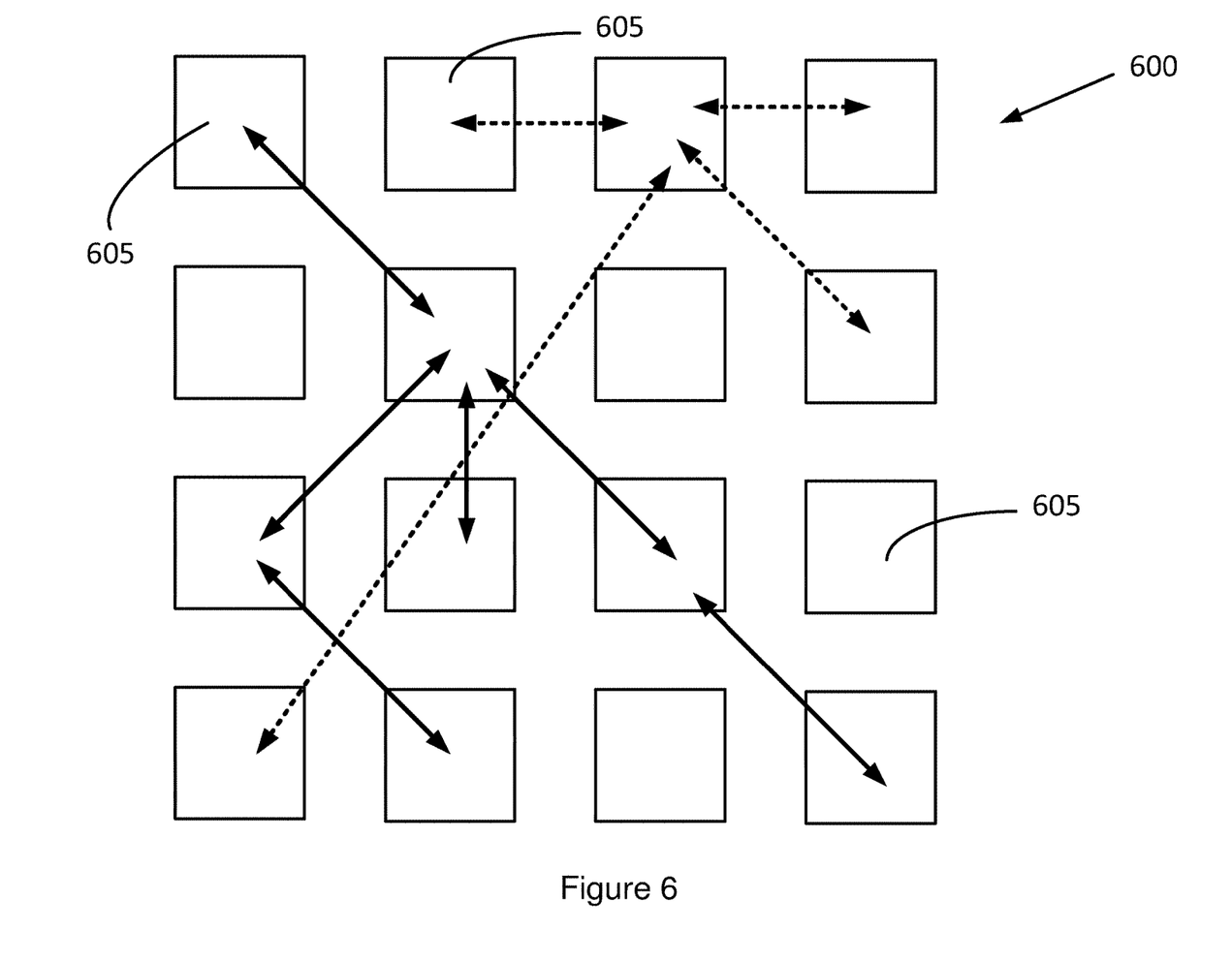
FIG. 6 depicts a simplified example of a network of wireless nodes with frequency synchronization, in accordance with embodiments herein.

FIG. 6 depicts a simplified example of a network of wireless nodes with frequency synchronization, in accordance with embodiments herein. Specifically, the network 600 may include a plurality of wireless nodes 605. The wireless nodes may include, for example, one or more nodes such as nodes 300, or one or more control nodes such as control nodes 400. As depicted in FIG. 6, the nodes 605 may generally synchronize into one or more groups of nodes. For example, FIG. 6 may depict a total of three groups of nodes. The first group may be the nodes 605 that are connected by the solid arrows. The second group may be the nodes 605 that are connected by the dashed arrows. The third group may be the nodes 605 that are not connected to other nodes. The various nodes 605 may be in wireless communication with one another, however the nodes 605 that are connected by the dashed arrows may represent a first group of nodes that are within a first locking range such as locking range 520. The nodes 605 that are connected by the solid arrows may represent a second group of nodes that are within a second locking range such as locking range 520. The nodes that are not connected by arrows may represent nodes that are not within a locking range. It will be understood that the depiction of FIG. 6 is a simplified example. In real-world embodiments the network 600 may include more or fewer connections of nodes. Additionally, the various ranges may include more or fewer nodes than depicted in FIG. 6. Similarly, the network 600 itself may include more or fewer nodes than depicted in FIG. 6.

Examples of Various Embodiments

Example 1 includes a system to be used in an oscillating neural network (ONN), wherein the system comprises: a control node; and a plurality of nodes wirelessly communicatively coupled with a control node, wherein a node of the plurality of nodes is to: identify an oscillation frequency of the node based on a weight W and an input X; and transmit a wireless signal to the control node, wherein a frequency of the wireless signal oscillates based on the identified oscillation frequency.

Example 2 includes the system of example 1, wherein the input X is based on sensed data of a sensor of the node.

Example 3 includes the system of example 1, wherein the node includes a housing with a transceiver and a voltage-controlled oscillator (VCO) positioned therein.

Example 4 includes the system of example 1, wherein respective ones of the plurality of nodes are physically separated from other ones of the plurality of nodes and from the control node.

Example 5 includes the system of any of examples 1-4, wherein the node is a first node, and wherein the first node is further to transmit the wireless signal to a second node of the plurality of nodes.

Example 6 includes the system of example 5, wherein the oscillation frequency of the first node and an oscillation frequency of the second node will synchronize based on transmission of the wireless signal to the second node.

Example 7 includes the system of any of examples 1-4, wherein the control node is to apply a non-linear thresholding function to the wireless signal.

Example 8 includes the system of example 7, wherein the non-linear thresholding function is a function of the neural network.

Example 9 includes a sensor node for use in an oscillating neural network (ONN), the sensor node comprising: a sensor to generate a signal related to a data sensed by the sensor; and a processor coupled with the sensor, wherein the processor is to: identify, based on the signal, an input X; identify a weight W; and identify, based on the input X and the weight W, an oscillation frequency; and a transmit module coupled with the processor, wherein the transmit module is to transmit a frequency-oscillating wireless signal, wherein the frequency-oscillating wireless signal is to oscillate based on the oscillation frequency.

Example 10 includes the sensor node of example 9, wherein the sensor node further includes a voltage-controlled oscillator (VCO), wherein the processor is to change a voltage input to the VCO to facilitate the transmission of the frequency-oscillating wireless signal.

Example 11 includes the sensor node of example 10, wherein the VCO is to, based on the voltage input, generate an oscillating input based on the oscillation frequency and transmit the oscillating input to the transmit module of the sensor node.

Example 12 includes the sensor node of example 11, wherein the transmit module is to transmit the frequency-oscillating wireless signal based on the oscillating input.

Example 13 includes the sensor node of any of examples 9-12, wherein the sensor node further includes a receive module to receive a frequency-oscillating wireless signal from a different sensor node of the ONN.

Example 14 includes the sensor node of example 13, wherein the oscillation frequency is a first oscillation frequency, and wherein the frequency-oscillating wireless signal from the different sensor node of the ONN has a second oscillation frequency, and wherein the processor is further to facilitate transmission of a frequency-oscillating wireless signal with a third oscillation frequency that is based on the first oscillation frequency and the second oscillation frequency.

Example 15 includes the sensor node of example 13, wherein the sensor node and the different sensor node are physically separated from one another.

Example 16 includes a control node to be used in an oscillating neural network (ONN), wherein the control node includes: receive circuitry to: receive a first frequency-oscillating wireless signal from a first sensor node, wherein an oscillating frequency of the first frequency-oscillating wireless signal is based on a first weight and a data generated by a sensor of the first sensor node; and receive a second frequency-oscillating wireless signal from a second sensor node, wherein an oscillating frequency of the second frequency-oscillating wireless signal is based on a second weight and a data generated by a sensor of the second sensor node; and a processor coupled with the receive circuitry, wherein the processor is to apply a non-linear thresholding function to the first frequency-oscillating wireless signal and the second frequency-oscillating wireless signal.

Example 17 includes the control node of example 16, wherein the oscillating frequency of the first frequency-oscillating wireless signal is based on the frequency of the second frequency-oscillating wireless signal.

Example 18 includes the control node of example 17, wherein the oscillating frequency of the second frequency-oscillating wireless signal is based on the frequency of the first frequency-oscillating wireless signal.

Example 19 includes the control node of any of examples 16-18, wherein the first sensor node and the second sensor node are physically separated from one another.

Example 20 includes the control node of any of examples 16-18, wherein the non-linear thresholding function is a non-linear thresholding function of the ONN.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or limiting as to the precise forms disclosed. While specific implementations of, and examples for, various embodiments or concepts are described herein for illustrative purposes, various equivalent modifications may be possible, as those skilled in the relevant art will recognize. These modifications may be made in light of the above detailed description, the Abstract, the Figures, or the claims.

The invention claimed is:

1. A neural network, comprising:
   a first sensor node comprising:
      a first sensor configured to generate a first sensor output based on detection of a first environmental condition, and
      a first processor configured to output a first signal that has a first oscillation frequency in a first locking range, the first signal generated based on the first sensor output;
   a second sensor node communicatively coupled with the first sensor node, the second sensor node comprising:
      a second sensor configured to generate a second sensor output based on detection of a second environmental condition, and
      a second processor configured to:
         receive the first signal from the first sensor node, output a second signal that has a second oscillation frequency in the first locking range, the second signal generated based on the second sensor output, determine a modified second oscillation frequency by synchronizing the second oscillation frequency in the first locking range with the first oscillation frequency in the first locking range, wherein synchronizing the second oscillation frequency with the first oscillation frequency comprises modifying the second oscillation frequency so that a difference between the modified second oscillation frequency and the first oscillation frequency is smaller than a difference between the second oscillation frequency and the first oscillation frequency, and output a modified second signal that has the modified second oscillation frequency; and a third sensor node configured to generate a third signal that has a third oscillation frequency in a second locking range, wherein the second locking range is different from the first locking range.

2. The neural network of claim 1, wherein the second sensor node includes a voltage-controlled oscillator (VCO), and the second processor is configured to determine the second oscillation frequency by determining a voltage provided to the VCO.

3. The neural network of claim 1, wherein the first sensor node is physically separated from the second sensor node.

4. The neural network of claim 1, wherein the first sensor node is further to transmit the first signal to a third sensor node of the neural network.

5. The neural network of claim 1, further comprising a control node that is configured to receive the first signal or the modified second signal and to apply a non-linear thresholding function to the first signal or the modified second signal.

6. A sensor node comprising:
a sensor configured to generate sensor data based on detection of an environmental condition;
a processor coupled with the sensor, wherein the processor is configured to:
receive a first signal from another sensor node communicatively coupled with the sensor node, the first signal having a first oscillation frequency in a first locking range,
determine a second oscillation frequency based on the sensor data and a weight signal, and
after determining that the second oscillation frequency is in the first locking range, determine a modified second oscillation frequency by synchronizing the second oscillation frequency with the first oscillation frequency, wherein synchronizing the second oscillation frequency with the first oscillation frequency comprises modifying the second oscillation frequency so that a difference between the modified second oscillation frequency and the first oscillation frequency is smaller than a difference between the second oscillation frequency and the first oscillation frequency; and
a transmit module configured to:
transmit a second signal having the second oscillation frequency, and
transmit a modified second signal having the modified second oscillation frequency,
wherein the sensor node and the another sensor node are in a neural network, the neural network further comprises a third sensor node configured to generate a third signal that has a third oscillation frequency in a second locking range, and the second locking range is different from the first locking range.

7. The sensor node of claim 6, wherein the transmit module includes a voltage-controlled oscillator (VCO) configured to output oscillation frequencies based on voltage inputs.

8. The sensor node of claim 7, wherein the processor is configured to determine the second oscillation frequency by determining a voltage provided to the VCO, and the VCO is configured to output the second oscillation frequency.

9. The sensor node of claim 6, wherein the transmit module further includes an antenna that is to transmit the second signal or the modified second signal as a wireless signal.

10. The sensor node of claim 6, wherein the sensor node further includes a receive module configured to receive the first signal from the another sensor node and to provide the first signal to the processor.

11. The sensor node of claim 6, wherein the second oscillation frequency is different from the first oscillation frequency.

12. The sensor node of claim 6, wherein the sensor node and the another sensor node are physically separated.

13. An oscillating neural network (ONN), comprising:
a control node configured to process a plurality of wireless signals to generate an output of the ONN; and
a plurality of sensor nodes configured to generate the plurality of wireless signals and to transmit the plurality of wireless signals to the control node, wherein the plurality of sensor node comprises:
a first sensor node configured to:
generate a first sensor output, and
output a first signal that has a first oscillation frequency in a first locking range, the first signal generated based on the first sensor output,
a second sensor node communicatively coupled with the first sensor node, the second sensor node configured to:
generate a second sensor output,
receive the first signal from the first sensor node,
output a second signal that has a second oscillation frequency in the first locking range, the second signal generated based on the second sensor output,
determine a modified second oscillation frequency by synchronizing the second oscillation frequency in the first locking range with the first oscillation frequency in the first locking range, wherein synchronizing the second oscillation frequency with the first oscillation frequency comprises modifying the second oscillation frequency so that a difference between the modified second oscillation frequency and the first oscillation frequency is smaller than a difference between the second oscillation frequency and the first oscillation frequency, and
output a modified second signal that has the modified second oscillation frequency, and
a third sensor node configured to generate a third signal that has a third oscillation frequency in a second locking range, wherein the second locking range is different from the first locking range.

14. The ONN of claim 13, wherein the first oscillation frequency and the second oscillation frequency are in a predetermined range.

15. The ONN of claim 14, wherein the plurality of sensor nodes further includes an additional sensor node configured to generate a wireless signal having an additional oscillation frequency that is out of the predetermined range.

16. The ONN of claim 13, wherein the first sensor node and the second sensor node are physically separated from one another.

17. The ONN of claim 13, wherein the control node is configured to process the wireless signals by applying a non-linear thresholding function on the wireless signals.

* * * * *